United States Patent Office 3,378,739
Patented Apr. 16, 1968

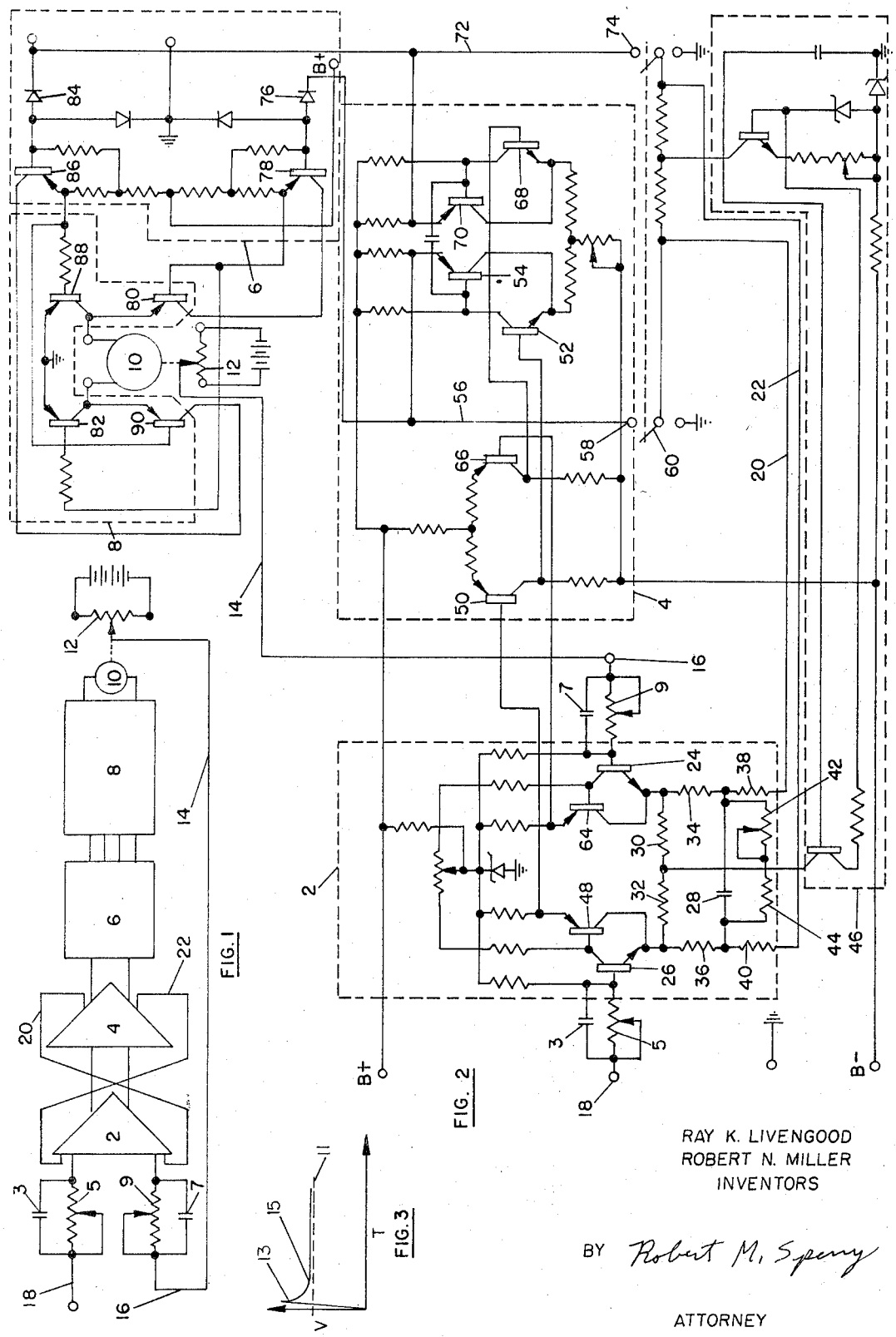

3,378,739
SERVO AMPLIFIER INCLUDING FILTER MEANS FOR REDUCING RESPONSE TIME
Ray K. Livengood, Torrance, Calif., and Robert N. Miller, Dallas, Tex., assignors to Ling-Temco-Vought, Inc., Dallas, Tex., a corporation of Delaware
Filed Aug. 20, 1964, Ser. No. 390,829
2 Claims. (Cl. 318—18)

ABSTRACT OF THE DISCLOSURE

This invention relates to servo amplifiers having filter means interposed in the command input circuit to shape the command signal in a manner to reduce the response time of the associated servomechanism and having similar filter means interposed in the feedback input circuit to shape the feedback signal in a manner to reduce the response time of the servo amplifier.

---

This invention relates to servo amplifiers and is particularly directed to novel servo amplifiers for rapidly and accurately controlling the operation of a servomechanism.

Numerous types of servo amplifiers have been proposed heretofore. However, none of the prior art servo amplifiers have been entirely satisfactory. Many prior art servo amplifiers provide a driving signal of uniform value and vary the duration of the driving signal to determine the positioning of the servomechanism controlled thereby. However, this means that the torque applied by the servomotor is uniform throughout the driving interval. On the other hand, in many instances, it is desirable to provide a high starting torque in order to overcome the inertia of the servomechanism. Other servo amplifiers provide a high starting torque but are subject to considerable "hunting" before settling at the desired value. Where rapid, accurate positioning of the servomechanism is needed, such "hunting" is, obviously, undesirable.

These disadvantages of prior art servo amplifiers are overcome with the present invention and a novel servo amplifier is provided which supplies maximum starting torque together with prompt and efficient damping upon attaining the desired position of the servomechanism. This arrangement provides substantially instantaneous response and rapid, accurate movement, while preventing "hunting." Moreover, the servo amplifier of the present invention employs a completely solid state circuit. Consequently, the device of the present invention is compact in size, economical in cost, and is able to withstand severe mechanical shock. Furthermore, the device of the present invention provides means for independently controlling the response times of the servo mechanism and the servo amplifier.

The advantages of the present invention are preferably attained by providing a solid state, direct current, servo amplifier comprising first input means including a first high pass filter for supplying a direct current command signal to said servo amplifier, second input means including a second high pass filter for supplying a second direct current signal to said servo amplifier, comparison means for comparing the value and polarity of said command signal with the value and polarity of said second signal and establishing a difference signal having a value and polarity indicative of the difference between said command signal and said second signal, means for amplifying said difference signal, feedback means for supplying said amplified difference signal to said comparison means to enhance the sensitivity of said comparison means, a transistor bridge circuit, means for applying said difference signal across said bridge, a direct current torque motor connected to receive energizing current from said bridge, means for establishing a direct current feedback signal having a value and polarity indicative of the output of said motor, and means for supplying said feedback signal to said second input means to form said second signal.

Accordingly, it is an object of the present invention to provide an improved servo amplifier.

An additional object of the present invention is to provide an improved servo amplifier including means for independently controlling the response times of the servo mechanism and the servo amplifier.

Another object of the present invention is to provide an improved servo amplifier providing high starting torque together with prompt and efficient damping upon attainment of a desired value.

A further object of the present invention is to provide a novel servo amplifier circuit which is compact in size, economical in cost and is capable of withstanding severe mechanical shock.

A specific object of the present invention is to provide a solid state, direct current, servo amplifier comprising first input means including a first high pass filter for supplying a direct current command signal to said servo amplifier, second input means including a second high pass filter for supplying a second direct current signal to said servo amplifier, comparison means for comparing said command signal with said second signal and establishing a difference signal having a value and polarity indicative of the difference between said command signal and said second signal, means for amplifying said difference signal, feedback means for supplying said amplified difference signal to said comparison means as a first feedback signal to enhance the sensitivity of said comparison means, a transistor bridge circuit, means for applying said difference signal across said bridge, a direct current torque motor connected to receive energizing current from said bridge, means for establishing a second feedback signal indicative of the output of said motor, and means for supplying said feedback signal to said second input means to form said second signal.

These and other objects and features of the present invention will be apparent from the following detailed description taken with reference to the figures of the accompanying drawings.

In the drawings:
FIGURE 1 is a block diagram of a servo amplifier embodying the present invention;
FIGURE 2 is a circuit diagram of the servo amplifier of FIG. 1; and
FIGURE 3 is a diagrammatic representation of the signals passed by the filters of the amplifier of FIG. 1.

In the form of the present invention chosen for purposes of illustration in the drawings, FIG. 1 shows a servo amplifier circuit comprising a differential amplifier 2, an intermediate amplifier 4, a driver circuit 6 and a transistor bridge 8 controlling a reversible, direct current torque motor 10 which drives a feedback potentiometer 12. The feedback potentiometer 12 establishes a direct current signal which is indicative of the position of the mechanism driven by motor 10 and supplies this signal through conductor 14 to one input 16 which passes the signal through a high pass filter including capacitor 7 and variable resistor 9 to the differential amplifier 2. A direct current command signal from a suitable external source, not shown, is supplied to another input 18 and is passed through a high pass filter including capacitor 3 and variable resistor 5 to the differential amplifier 2. The signals on inputs 16 and 18 are compared by the differential amplifier 2 and a signal indicative of the difference between inputs 16 and 18 is amplified by one or more intermediate amplifiers 4. The amplified difference signal is supplied to driver circuit 6 and is also applied as a feedback signal through conductors 20 and 22, to the differential amplifier 2 to stabilize the gain of the differential amplifier 2. The driver circuit 6 applies the amplified difference signal across a transistor bridge 8, which acts essentially as a double pole, double throw switch, to apply the difference signal to drive motor 10.

Many of the advantages of the present invention are obtained by the provision of the high pass filters in both inputs 16 and 18. The filter in the comand signal input 18, including capacitor 3 and resistor 5, receives incoming command signals and shapes them in the manner indicated in FIG. 3. Thus, when a command signal, having a value indicated by dashed line 11, is applied to input 18, capacitor 3 becomes charged instantly but discharges rapidly through resistor 5. This causes the signal applied to the differential amplifier 2 to overshoot momentarily, as indicated at 13, and then immediately drop to the applied signal value, as indicated at 15. The overshoot spike 13 drives one of the transistors 24 or 26 to saturation, depending upon the polarity of the applied signal. This enhances the sensitivity of differential amplifier 2 to slight changes in the command signal. In addition, the spiked signal is passed through the servo amplifier circuit and is applied to motor 10 where the spike aids in overcoming the inertia of the motor 10, thereby increasing the speed of response of the servo mechanism. As motor 10 responds to the command signal, it drives potentiometer 12 to a new position, causing a signal to be applied by feedback conductor 14 to input 16 of differential amplifier 2. The feedback signal is filtered by capacitor 7 and resistor 9 to provide a spiked signal in the same manner described above with respect to the command signal. The spike of the feedback signal serves to overcome the saturation of transistor 24 or 26, depending upon which transistor was saturated by the command signal spike, as indicated above, and places the differential amplifier 2 in condition to receive a subsequent command signal. Thus, the response time of the servo mechanism may be controlled by adjusting resistor 5, while the response time of the servo amplifier may be controlled independently by adjusting resistor 7.

As seen in FIG. 2, transistors 24 and 26 of differential amplifier 2 serve to amplify the signals supplied to inputs 16 and 18, respectively, and the amount of amplification will depend upon the base-emitter bias of the particular transistor. The feedback and derivative signal supplied to input 16 is applied as the base potential of transistor 24 while the command signal and derivative supplied to input 18 is applied as the base potential of transistor 26. The emitter potentials for both transistors 24 and 26 are derived from the network consisting of capacitor 28 and resistors 30, 32, 34, 36, 38, 40, 42 and 44. Resistor 44 is variable and serves as a gain adjustment for the differential amplifier 2. Briefly, the feedback signals appearing on conductors 20 and 22 are the amplified outputs of transistors 24 and 26, but have polarities the same as those of the original signals on inputs 16 and 18. These feedback signals cause a potential difference across capacitor 28 and current from a suitable constant current source, indicated by the circuitry contained in dashed block 46, tends to balance this difference by flowing though resistors 30 and 34 or 32 and 36, as needed. The current flow from source 46 creates emitter potentials for transistors 24 and 26 which are degenerative with respect to the signals on inputs 16 and 18. Consequently, the response time and drift differential amplifier 2 is significantly reduced and its stability to slight variations in the input signals is greatly enhanced.

More specifically, when a command signal is applied to input 18 of differential amplifier 2, the signal is amplified by transistor 26 and is reversed in polarity. The amplified, inverted signal is passed through emitter follower 48 and is applied to the base of transistor 50 of intermediate amplifier 4. Transistor 50 amplifies the signal, returns it to its original polarity, and applies the signal to the base of transistor 52. Transistor 52 again amplifies the signal and reverses its polarity for a third time. The signal is then passed through emitter follower 54 and is applied to conductor 56 which is connected, through contact 58 of switch 60 to feedback conductor 20. Similarly, signals applied to input 16 are amplified and inverted by transistor 24 and are passed through emitter follower 64 to the base of transistor 66. Transistor 66 amplifies and inverts the signal and applies it to transistor 68 which amplifies and inverts the signal for a third time. The signal is then passed through emitter follower 70 to conductor 72 and is connected through contact 74 of switch 60 to conductor 22. Thus, the signals supplied to inputs 16 and 18 are amplified and reversed in polarity and are applied, through feed-back conductors 20 and 22, across capacitor 28.

To drive the servo motor 10, negative signals appearing on conductor 56 are supplied through diode 76 to transistor 78 of driver circuit 6 and are then applied through transistors 80 and 82 of transistor bridge 8 to drive motor 10 in one direction. Similarly, negative signals appearing on conductor 72 are supplied through diode 84 to transistor 86 of driver circuit 6 and are then passed through transistors 88 and 90 of transistor bridge 8 to drive motor 10 in the opposite direction. Diodes 76 and 84 act to block passage of positive signals appearing on the respective conductors 56 and 72.

From the foregoing discussion, it will be seen that unless the signals appearing on inputs 16 and 18 are exactly equal, the difference will be amplified and supplied to drive motor 10 in an appropriate direction to move potentiometer 12 to balance the signals. At the time, the amplified difference signal will be applied through conductors 20 and 22 to capacitor 28 to create a regenerative feedback. This causes the system to have an extremely rapid response and to be highly sensitive to even slight differences between the input signals and provides prompt and efficient damping of any overshoot because of the leading components of both signal and feedback.

Numerous variations and modifications may obviously be made without departing from the invention. Accordingly, it should be clearly understood that the form of the present invention described above and shown in the figures of the accompanying drawing is illustrative only and is not intended to limit the scope of the present invention.

What is claimed is:

1. A servo amplifier comprising:

first input means for supplying a command signal to said servo amplifier, second input means for supplying a second signal to said servo amplifier, comparison means for comparing said command signal with said second signal and establishing a difference signal indicative of the difference between said command signal and said second signal, motor means, means for applying said difference signal to drive said motor, means driven by said motor for establishing a feedback signal indicative of the output of said motor and applying said feedback signal to said second input to form said second signal, a first high pass filter included in said first input means for controlling the response time of said motor, and a second high pass filter included in said second input for controlling the response time of said comparison means.

2. A servo amplifier comprising:

first input means for supplying a command signal to said servo amplifier, second input means for supplying a second signal to said servo amplifier, comparison means for comparing said command signal with said second signal and establishing a difference signal indicative of the difference between said command signal and said second signal,
motor means,
means for applying said difference signal to drive said motor,
means driven by said motor for establishing a feedback signal indicative of the output of said motor and applying said feedback signal to said second input to form said second signal,
first high pass filter means having a capacitor and a variable resistor connected in shunt in said first input means for controlling the response time of said motor, and
second high pass filter means having a capacitor and a variable resistor connected in shunt in said second input means for controlling the response time of said comparison means.

References Cited

UNITED STATES PATENTS

| | | | |
|---|---|---|---|
| 2,880,384 | 3/1959 | Surtees | 318—489 |
| 3,043,997 | 7/1962 | Marshall | 318—207 |
| 3,167,378 | 1/1965 | Taile | 318—29 |
| 3,216,676 | 11/1965 | Brown et al. | 318—28 XR |
| 3,310,721 | 3/1967 | Möller | 318—448 |

BENJAMIN DOBECK, *Primary Examiner.*